UNITED STATES PATENT OFFICE.

HENRY HOFFMAN AND CHARLES F. HILL, OF NEW YORK, N. Y.

IMPROVEMENT IN ORNAMENTING MARBLE.

Specification forming part of Letters Patent No. 8,046, dated April 15, 1851.

*To all whom it may concern:*

Be it known that we, HENRY HOFFMAN and CHARLES F. HILL, of the city, county, and State of New York, have invented the following Method of Etching Marble, Shell, and similarly composed Materials; and we do hereby declare that subjoined is a correct description of the same.

Draw the figures on the marble or shell with an ink of this composition, viz: equal parts, by weight, of soot, spirits of wine, and gallic acid. To four ounces of this mixture add a half-ounce gum-arabic, seventy drops of phosphoric acid, and twenty drops muriatic acid. With this ink draw on the stone or shell, and after the same is dry cover the entire surface with the following wax-colors, viz: one pound yellow beeswax, one pound of tallow or suet, and three and a half ounces of soot mixed over a slow fire. Now immerse the marble or shell in water of ordinary well or river temperature for forty-five minutes or longer. This will cause the thin coat of wax-color to come off the marble or shell in those places where the ink was under it; but the wax-color will still adhere to the stone or shell in all places where no ink was under it. Next, with beeswax so pliant or warm as not to break, form a wall an inch or so high on the marble or shell to encompass the drawing. Make the wall project a little over the wax-color, that the etch-water may not eat between the edge of the wax-color and wall. Make the etch-water of muriatic acid diluted with water until the hydrometer will sink to about 3°. Pour the etch-water within the wax-wall. In about twenty minutes etchings will be made about two and a half lines deep, corresponding with the drawings that were made. Turpentine will dilute the wax-color so that it can be easily rubbed off while so diluted. In the ink the proportions named are about the best. The disproportion of the acids named will impair the virtue of the ink. Spirits of wine is to be preferred to alcohol, and wood-soot is most desirable in either ink or wax color. The soot should be fine. Prepare the surface for the drawing with pumice-stone.

What we claim as ours, and wish to secure by Letters Patent, is—

The above-described ink and the wax-color and etch-water used in combination therewith, substantially as described above.

HENRY HOFFMAN.
   CHARLES FREDERICK HILL.

In presence of—
 WM. H. BAILEY,
 WM. O. EMMONS.